No. 664,658. Patented Dec. 25, 1900.
J. MASSARO.
FIRE AND WATER PROOF REMOVABLE WALL, FLOOR, &c.
(Application filed Feb. 21, 1900.)

(No Model.) 5 Sheets—Sheet 1.

Inventor
John Massaro.

Witnesses:
By
Attorneys.

No. 664,658. Patented Dec. 25, 1900.
J. MASSARO.
FIRE AND WATER PROOF REMOVABLE WALL, FLOOR, &c.
(Application filed Feb. 21, 1900.)
(No Model.) 5 Sheets—Sheet 2.
FIG. 5
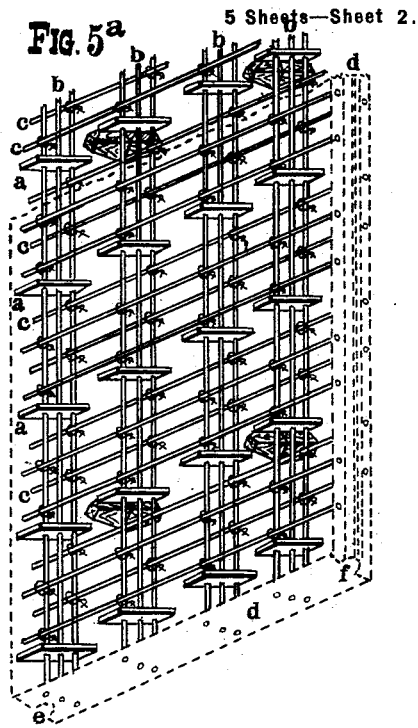
FIG. 5ᵃ
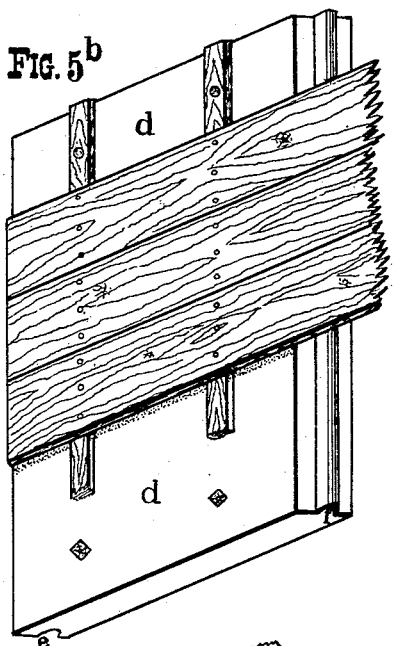
FIG. 5ᵇ
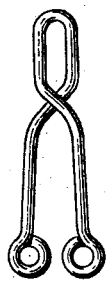
FIG. 7
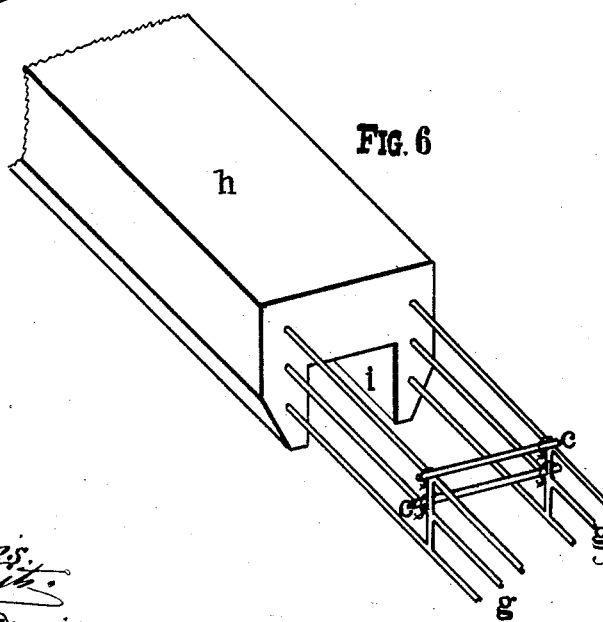
FIG. 6
Witnesses
Inventor
John Massaro.
By
Attorneys.

No. 664,658. Patented Dec. 25, 1900.
J. MASSARO.
FIRE AND WATER PROOF REMOVABLE WALL, FLOOR, &c.
(Application filed Feb. 21, 1900.)
(No Model.) 5 Sheets—Sheet 3.
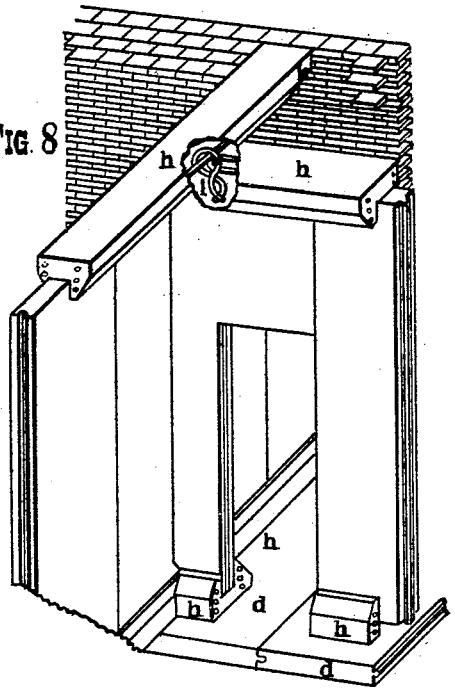
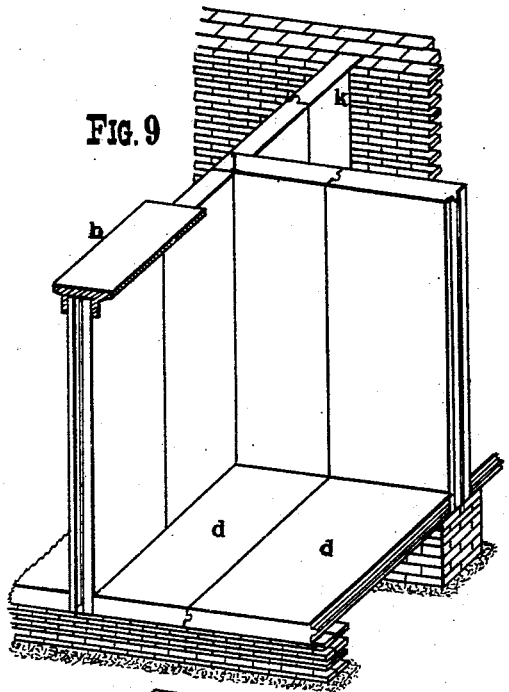
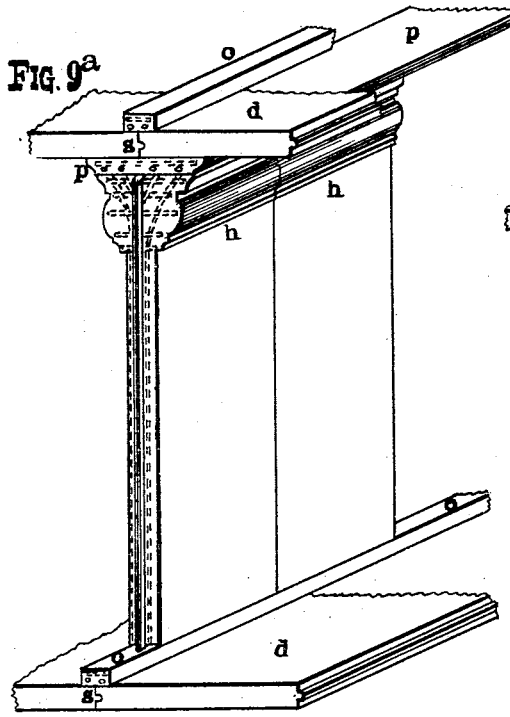
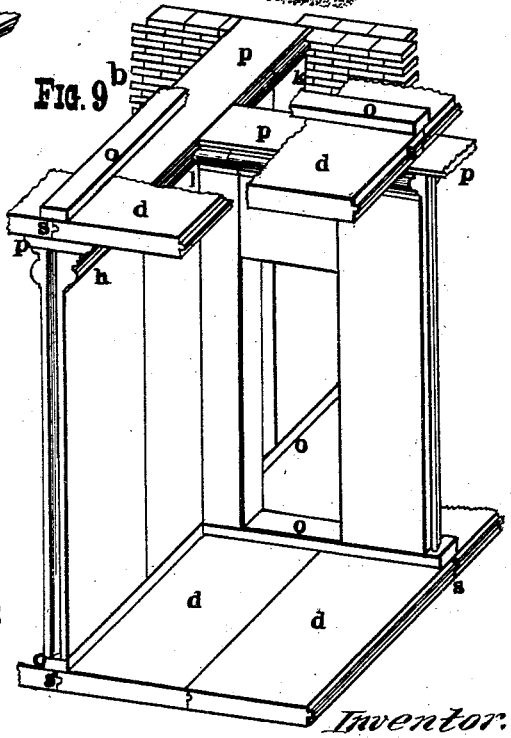
Witnesses.
Inventor:
John Massaro.
By Attorneys.

No. 664,658. Patented Dec. 25, 1900.
J. MASSARO.
FIRE AND WATER PROOF REMOVABLE WALL, FLOOR, &c.
(Application filed Feb. 21, 1900.)
(No Model.) 5 Sheets—Sheet 4.
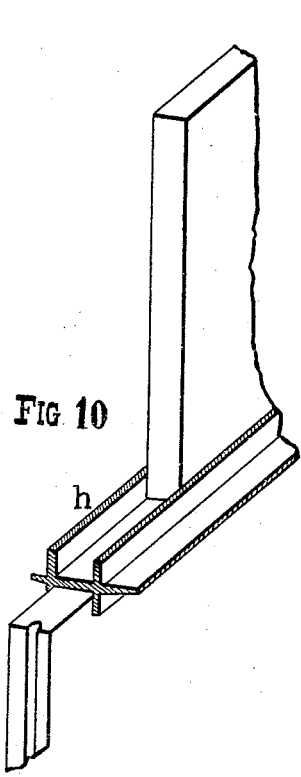
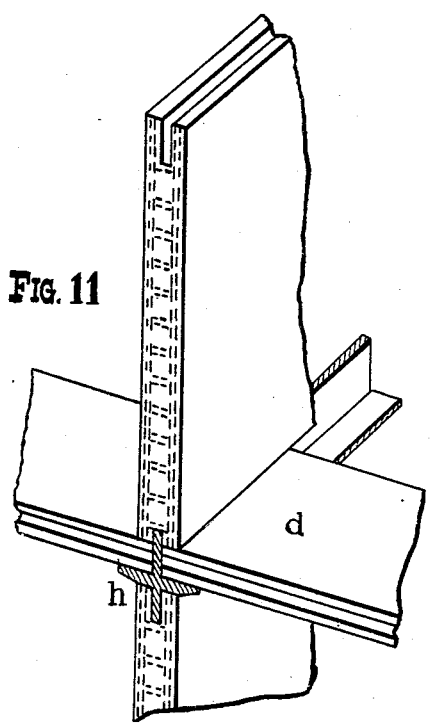
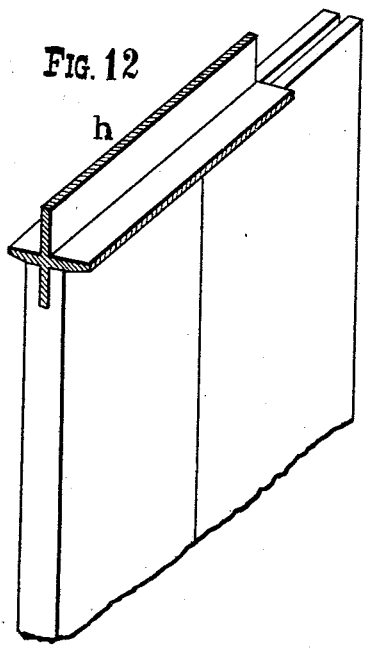
Inventor
John Massaro.
By
Attorneys.

No. 664,658. Patented Dec. 25, 1900.
J. MASSARO.
FIRE AND WATER PROOF REMOVABLE WALL, FLOOR, &c.
(Application filed Feb. 21, 1900.)
(No Model.) 5 Sheets—Sheet 5.

Witnesses.
Inventor
John Massaro.
By
Attorneys.

UNITED STATES PATENT OFFICE.

JOHN MASSARO, OF FRANKFORT-ON-THE-MAIN, GERMANY.

FIRE AND WATER PROOF REMOVABLE WALL, FLOOR, &c.

SPECIFICATION forming part of Letters Patent No. 664,658, dated December 25, 1900.

Application filed February 21, 1900. Serial No. 6,109. (No model.)

*To all whom it may concern:*

Be it known that I, JOHN MASSARO, a subject of the King of Italy, residing at Frankfort-on-the-Main, Germany, have invented a new and useful kind of fire and water proof removable walls and floors of an uncommon bearing strength and their use for the erection of all kinds of buildings, (for which invention I have received Letters Patent in France, No. 290,042, dated October 9, 1899, and in Germany the protection, No. 126,347, dated October 28, 1899,) of which the following is a specification.

I attain the objects by proceeding as illustrated in the accompanying drawings, in which—

Figure 1:
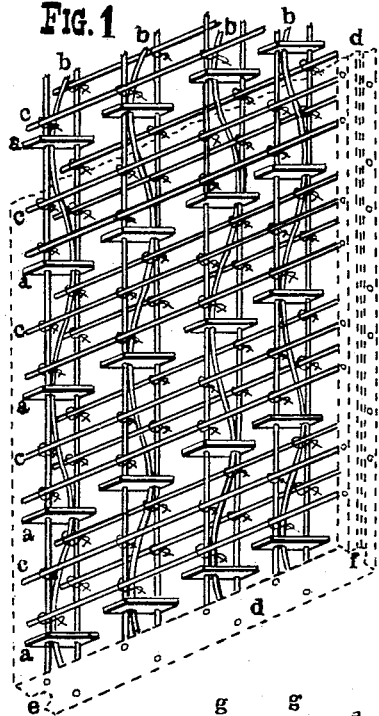

Figure 1 is an iron floor-plate consisting in rows of plates $a$, standing upright and being set at convenient distances. They are provided with holes, where iron bars are drawn through, of which those in the middle $b$ have a vaulted shape, giving an extraordinary strength to floors for bearing the heaviest charges, and they are used especially for floors of an extended area, as for large warehouses, grain-elevators, halls, &c. Upon these longitudinal bars are tied up the cross-bars $c$ by means of binding-wire. This iron floor-plate is then brought in a mold of the convenient size, filled up, and covered with a layer of cement, beton, hydraulic mortar, or any convenient material, (in preference cement,) and on all sides even with the bars, so that the obtained floor-plates $d$ are bearing as well on the iron as on the cement. Besides, the plates are provided on their edges, where they will be fitted together, with grooves and tongues $e$ $f$. It may be expressly noticed that these wall and floor plates are not to be confounded with other kinds of similar cement-work where iron bars or wire grates are inserted only in order to hold the cement together. They have—founded on facts—to be considered as iron floors and walls, and the cement or any other material is used to the only purpose of obtaining a straight and even surface. Among the many possible other kinds of iron constructions the following drawings show examples of ironwork for lighter floor and wall plates.

Figure 2:
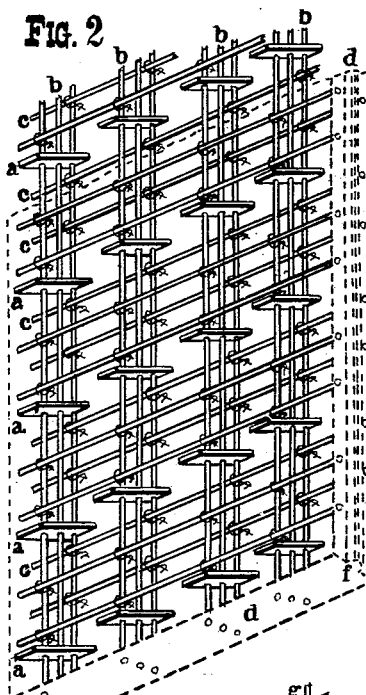
Figure 3:
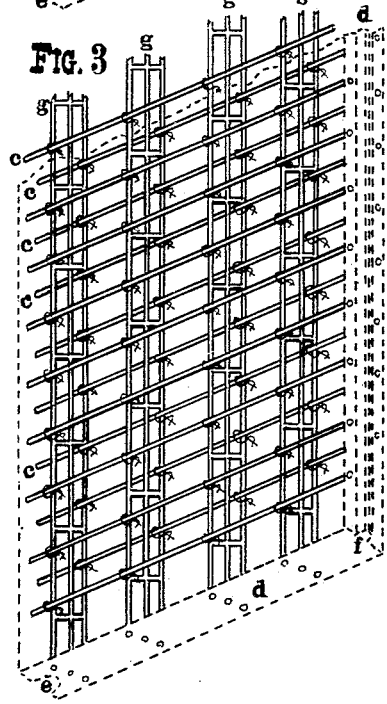
Figure 4:
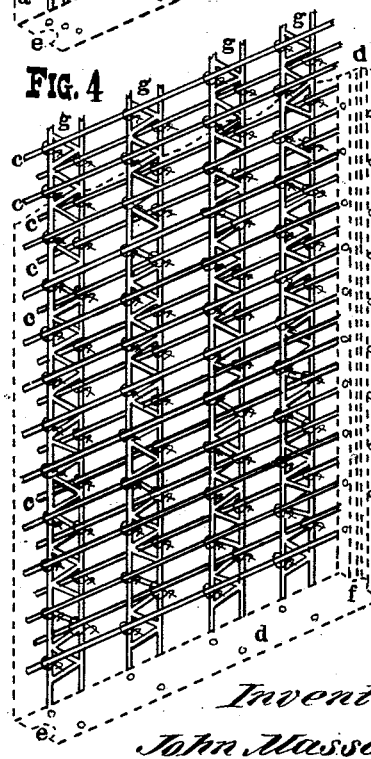

Fig. 2 shows the same iron construction as Fig. 1, except the middle bars $b$ are in straight line, and in Figs. 3 and 4 the upright plates $a$ and the longitudinal bars $b$ are replaced by gratings $g$, of malleable cast-iron, and according to the strength, thickness, or the desired purpose the one or the other kind is used. Fig. 5 is a block of hard wood having the shape of a double cone. These blocks are cast in the floor-plates at convenient distances for the use of nailing up oil-cloth, carpets, or laths and planks. The space between them and the cement is then filled up with ashes in order to obtain a dry and warm floor. (See Figs. $5^a$ and $5^b$.)

The main point of this invention is particularly the use of these wall and floor plates for erecting buildings. To this purpose different kinds of beams are used.

Figs. 6 and 8 show a kind of beams $h$ with longitudinal iron bars $g$, connected with cross-bars $c$ and straightened up with layers of cement. These beams have in their middle a groove $i$, Fig. 6, in which the wall-plates are fitted, Fig. 8. Fig. 7 is an iron clasp cast in the cement at the end of each beam having a partition-wall to hold. The ends of the beams maintaining the main walls are fixed in the brickwork $k$, Fig. 8, on about half its thickness, and the clasps of the partition-beams are connected firmly with the longitudinal bars of the main beams by loops of round iron $l$, Fig. 8, which connection is made after having cut off the necessary quantity of cement, and then the place is re-covered with cement mortar. By this proceeding any danger of tumbling is entirely excluded. It is evident that this kind of beams can be (according to the strength) rolled-iron or malleable-iron ones and the shape of them can be of different kinds. For instance, Fig. 9 is an iron beam of the same shape shown in Figs. 6 and 8, Fig. 10 is a double beam, and Figs. 11 and 12 are cross-beams fitting in grooves on bottom and top of the wall-plates and are bearing on their iron bars, Fig. 11. The beams can be in general of any length; but they always must be long enough to include both halves of two plates. The main wall can be maintained also by a groove left in the stone or brick work $k$, Fig. 9, also the partition-walls by setting them between two plates of the main wall $l$, Fig. 9. On this place is set a piece of a beam having the shape of a T, including both halves of the main-wall plates and one half of the partition-wall plate.

Another proceeding as a substitute for all foregoing-described beams is to cast them in one piece with the wall-plates by bending their iron bars on their top outward, Fig. 9ᵃ, and a regular cornice h' can be cast at the same time with the plates. In this case the wall-plates are not set directly on the floor-plates d, but on the whole length of their side joints s, Figs. 9ᵃ and 9ᵇ, are laid junction-plates o of iron and cement. Then the wall-plates are set thereupon and both well connected with cement mortar. Another larger junction-plate p is then laid on the top of the cornices h' in order to connect them firmly on their side joints. Then are laid the floor-plates d and then junction-plates o again, and so on through all the stories.

Figure 13:
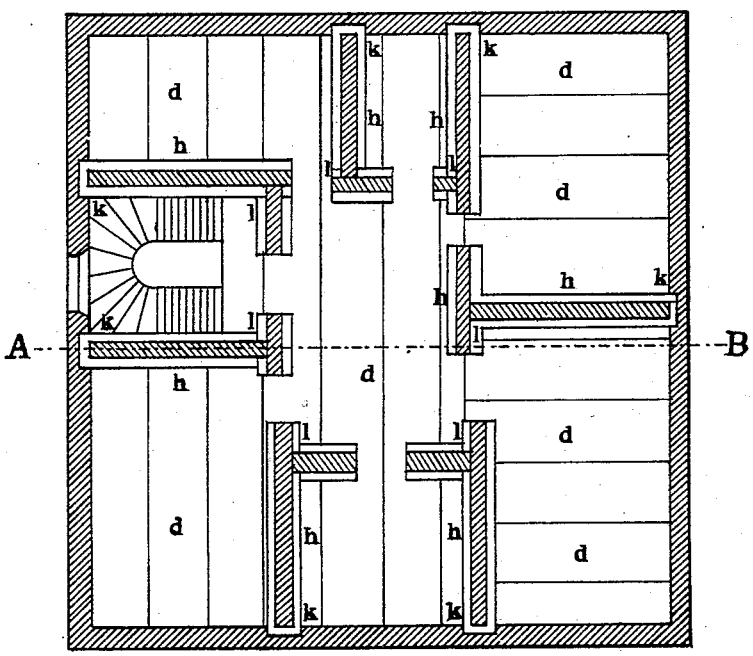
Figure 14:
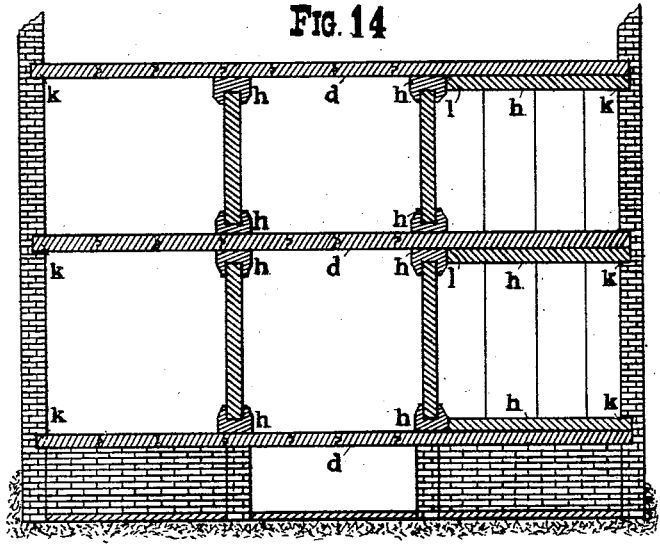

The building is erected on a solid foundation of brick or stone work, and Fig. 13 is a horizontal section of a story; and Fig. 14 a vertical section after A B, of a building of this kind, (without taking into consideration the windows.) On the foundation are laid the floor-plates d, thereupon the beams h², maintaining the wall-plates underneath, Fig. 14. The latter are set in the grooves and the upper beams on their top and inserted with their ends in the brick wall k, Figs. 8, 9, and 9ᵇ. Then the building up is continued equally in the same manner for all the stories—a work that rapidly succeeds, provided that the cement-foundry is furnishing the plates and beams readily finished and of the correct lengths and sizes.

The advantages of this system are evident, solid buildings being fire and water proof are obtained, and, besides, they are cheaper than any other kind. They can be built up in the shortest possible time and can be promptly removed to some other place—an advantage of the greatest importance if the building-ground has been taken only on lease.

Having fully described my invention, what I claim, and desire to secure by Letters Patent, is—

1. A skeleton framework, having two series of longitudinal members in different planes, connections uniting the members of one series with those of the other, transverse connections uniting the several members of the series, and a filling.

2. In building construction, a composite beam made up of a skeleton frame, having series of longitudinal members united by two series of transverse members, running at approximately right angles to each other and bracing the longitudinal members in two directions, and a filling.

3. A building-block, comprising longitudinal bars or rods arranged in sets, the rods or bars of each set being connected together, transverse rods or bars secured to and connecting the sets of longitudinal rods or bars, and a filling of cement, substantially as described.

4. A building-block, comprising longitudinal bars or rods arranged in sets, plates through which the rods pass and by which the said rods are connected together, transverse rods or bars secured to and connecting the said sets of rods or bars together, and a filling of cement, substantially as described.

5. A building-block, comprising longitudinal rods or bars arranged in sets, each set consisting of three rods or bars, the central one of which is serpentine, plates through which the rods or bars pass and by which they are connected together, transverse rods or bars secured to and connecting the said sets of rods or bars, and a filling of cement, substantially as described.

6. A building-block, comprising longitudinal bars or rods arranged in sets, the rods or bars being connected together, transverse rods or bars secured to and connecting the said sets of rods or bars, wooden blocks arranged at intervals, and a filling of cement, substantially as described.

7. In the construction of buildings, composite building-blocks formed of sets of rods or bars arranged at angles to each other and secured together, and a filling of cement, and beams for supporting the blocks forming a wall, said blocks and beams having a groove connection, substantially as described.

8. In the construction of buildings, composite building-blocks formed of sets of rods or bars arranged at angles to each other, and secured to one another, and a filling of cement, and beams grooved on opposite sides to receive the edges of the said blocks, substantially as described.

9. In the construction of buildings, composite building-blocks, formed of a skeleton metal frame, and a filling of cement, and a composite beam formed of a skeleton frame and cement, the said beam being grooved to receive the blocks, substantially as described.

10. In the construction of buildings, a composite beam formed of cement having longitudinal rods embedded therein, and an auxiliary or partition beam also formed of cement having longitudinal rods or bars embedded in them, said auxiliary beam also having clasps embedded in them for connecting them with the main beam, substantially as described.

11. In the construction of buildings, a composite main beam formed of cement having longitudinal rods or bars embedded therein, an auxiliary or partition beam also formed of cement having longitudinal rods or bars embedded in them, said partition-beam also having clasps embedded in its ends, and means for securing the clasps to the longitudinal rods or bars of the main beams, substantially as described.

JOHN MASSARO.

Witnesses:
FRANCIS HARTMANN,
JEAN GRUND.